United States Patent
Kishimoto et al.

(10) Patent No.: US 7,414,087 B2
(45) Date of Patent: Aug. 19, 2008

(54) RUBBER COMPOSITION AND PNEUMATIC TIRE USING THE SAME

(75) Inventors: Hiroyuki Kishimoto, Kobe (JP); Noriko Yagi, Kobe (JP); Kiyoshige Muraoka, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 380 days.

(21) Appl. No.: 10/882,164

(22) Filed: Jul. 2, 2004

(65) Prior Publication Data

US 2005/0043466 A1    Feb. 24, 2005

(30) Foreign Application Priority Data

Aug. 20, 2003  (JP) ............... 2003-208084
Oct. 14, 2003  (JP) ............... 2003-353886

(51) Int. Cl.
*C08K 9/06* (2006.01)
*B60C 5/14* (2006.01)

(52) U.S. Cl. ............... 524/495; 524/424; 524/438; 524/496

(58) Field of Classification Search ............... 524/424, 524/438, 492, 495
See application file for complete search history.

(56) References Cited

U.S. PATENT DOCUMENTS 3,856,686 A * 12/1974 Sato et al. ............... 508/112
4,141,849 A *  2/1979 Hasegawa et al. ...... 430/108.11
5,489,628 A *  2/1996 Sandstrom ............... 523/213
5,728,311 A *  3/1998 Patitsas et al. ............... 249/65
2003/0036599 A1* 2/2003 Mori et al. ............... 524/496
2004/0226643 A1* 11/2004 Yagi et al. ............... 152/510

FOREIGN PATENT DOCUMENTS

| JP | 11-34605 A   | 2/1999  |
| JP | 2001-72807 A | 3/2001  |
| JP | 2001-213112 A| 8/2001  |
| JP | 2001-247719 A| 9/2001  |
| JP | 2001-279020 A|10/2001  |
| JP | 2002-53706 A | 2/2002  |
| JP | 2002-206037 A| 7/2002  |
| JP | 2003-26858 A | 1/2003  |

OTHER PUBLICATIONS

Database WPI; Section Ch, Week 198749; Derwent Publications Ltd., London, GB; AN 1987-344243; XP002297412.
Database WPI; Section Ch, Week 200245; Derwent Publications Ltd.; London, GB; AN 2002-420419; XP002297413.

* cited by examiner

*Primary Examiner*—Katarzyna Wyrozebski
(74) *Attorney, Agent, or Firm*—Birch, Stewart, Kolasch & Birch, LLP

(57) ABSTRACT

The present invention provides a rubber composition, in which reversion when vulcanizing at a high temperature is inhibited without losing rubber properties and which is obtained by efficiently crosslinking with sulfur, and a pneumatic tire using the rubber composition. Specifically, the present invention relates to a rubber composition comprises a rubber component containing diene rubber and fluorinated graphite and a pneumatic tire using the rubber composition. The rubber composition preferably contains 0.1 to 50 parts by weight of fluorinated graphite based on 100 parts by weight of the rubber component containing diene rubber.

5 Claims, 1 Drawing Sheet

X = 1 ~ 8

RUBBER COMPOSITION AND PNEUMATIC TIRE USING THE SAME

This Non-provisional application claims priority under 35 U.S.C. § 119(a) on patent application Ser. No(s). 2003-208084 and 2003-353886 filed in Japan on Aug. 20, 2003 and Oct. 14, 2003 respectively, the entire contents of which are hereby incorporated by reference.

BACKGROUND OF THE INVENTION

The present invention relates to a rubber composition, in which reversion is inhibited without losing rubber properties such as scorch properties, and a pneumatic tire using the composition.

Conventionally, sulfur has mainly been used as a vulcanizing agent for vulcanizing rubber. Usually, when diene rubber such as isoprene rubber is vulcanized at a high temperature using sulfur as a vulcanizing agent, as shown in FIG. 1, polysulfide bonds that link the crosslinking points are split and reversion occurs. When reversion occurs, there is the problem that properties, such as elastic modulus and heat generating properties, of the vulcanized article decrease. Also, there is the problem that rubber properties such as strength at break and elongation at break decrease, as the polysulfide bonds in the rubber also tend to break easily after vulcanization. To solve these problems, employed are the method of vulcanizing at a relatively low temperature and methods such as semi EV vulcanization (semi-effective vulcanization) and EV vulcanization (effective vulcanization), in which sulfur vulcanization reaction is conducted efficiently by reducing the amount of sulfur and increasing the amount of the vulcanization accelerator. However, as secondary effects of these methods, a long period of time is required for vulcanization, thereby decreasing productivity, and there are problems in processability, as scorch properties are lost.

Also, known is the method of using a vulcanizing agent for rubber that inhibits reversion when vulcanizing (see JP-A-2002-53706). However, both the effects of inhibiting reversion and preventing decrease in rubber properties cannot be satisfied.

Furthermore, known is a rubber composition in which expanded graphite is compounded in diene rubber, but the effect of inhibiting reversion is not satisfactory (see JP-A-2002-293990).

The present invention aims to provide a rubber composition, in which reversion when vulcanizing at a high temperature is inhibited without losing rubber properties and which is obtained by efficiently crosslinking with sulfur, and a pneumatic tire using the rubber composition.

SUMMARY OF THE INVENTION

The present invention relates to a rubber composition comprising a rubber component containing diene rubber and fluorinated graphite that satisfies the following formula (1)

—(CFx)n—     (1)

(wherein n is an integer and x is 1 or 2).

The rubber composition preferably comprises 0.1 to 50 parts by weight of fluorinated graphite, based on 100 parts by weight of a rubber component containing diene rubber.

The rubber composition preferably contains 5 to 100% by weight of epoxidized natural rubber in the rubber component as diene rubber.

The rubber composition preferably contains 5 to 150 parts by weight of silica having nitrogen adsorbing specific surface area of 100 to 300 m²/g based on 100 parts by weight of the rubber component.

The rubber composition preferably contains 5 to 150 parts by weight of carbon black having nitrogen adsorbing specific surface area of 70 to 300 m²/g based on 100 parts by weight of the rubber component.

The present invention also relates to a pneumatic tire comprising the rubber composition.

DETAILED DESCRIPTION

Figure 1:
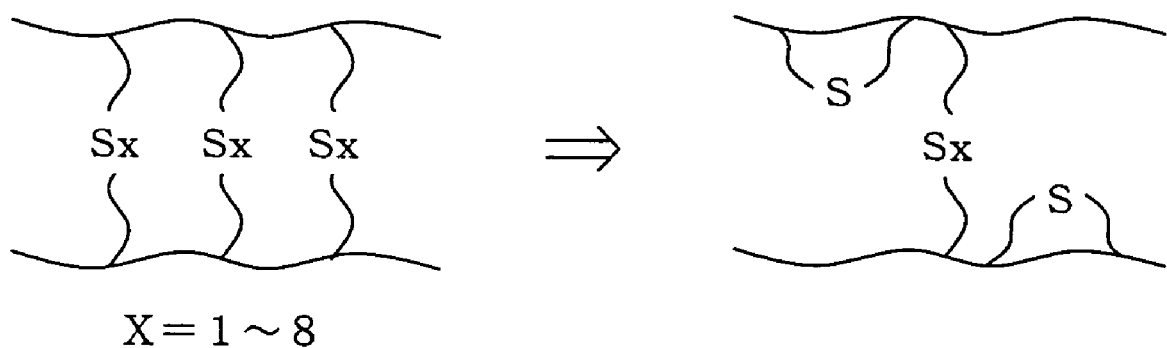
FIG. 1 is an explanatory drawing of reversion, which occurs when polysulfide bonds that link crosslinking points are split.

The rubber composition of the present invention comprises a rubber component containing diene rubber and fluorinated graphite.

Examples of the diene rubber are natural rubber (NR), polyisoprene rubber (IR), various polybutadiene rubbers (BR), various styrene-butadiene copolymer rubbers (SBR), acrylonitrile-butadiene copolymer rubber (NBR), polychloroprene rubber (CR) and ethylene-propylene-diene rubber. The diene rubber can be used alone or two or more kinds can be used together. Of these, natural rubber is preferably used and epoxidized natural rubber is more preferably used.

As the epoxidized natural rubber, commercially available epoxidized natural rubber can be used or natural rubber can be epoxidized and then used. The method for epoxidizing natural rubber is not particularly limited and epoxidation can be conducted using methods such as the chlorohydrin method, the direct oxidization method, the hydrogen peroxide method, the alkyl hydroperoxide method and the peracid method. An example is the method of reacting natural rubber with organic peracid such as peracetic acid or performic acid.

The amount of epoxidized natural rubber is preferably at least 5% by weight, more preferably at least 8% by weight, further preferably at least 10% by weight, of the rubber component. When the amount of epoxidized natural rubber is less than 5% by weight, the effects due to the epoxidized natural rubber such as wet grip performance may not be obtained. Also, the amount of epoxidized natural rubber is preferably at most 100% by weight of the rubber component.

The epoxidation degree of the epoxidized natural rubber is preferably at least 5% by mol, more preferably at least 10% by mol. When the epoxidation degree is lower than 5% by mol, the effects obtained by modifying, such as the effects of improving wet grip performance and gas barrier properties, tend to be small. Also, the epoxidation degree is preferably at most 80% by mol, more preferably at most 60% by mol. When the epoxidation degree is higher than 80% by mol, the polymer tends to gelate, thus being unfavorable.

The diene rubber may optionally contain at least one resin selected from polyethylene (PE), polypropylene (PP), styrene-butadiene-styrene copolymer (SBS), styrene-isoprene-styrene copolymer (SIS) and styrene-ethylene-propylene-styrene copolymer (SEPS).

The rubber composition of the present invention may optionally contain at least one non-diene rubber selected from butyl rubber (IIR), halogenated butyl rubber and rubber obtained by halogenating a copolymer of isomonoolefin having 4 to 7 carbon atoms and p-alkylstyrene, together with the diene rubber.

The fluorinated graphite is represented by formula (1)

$$-(CF_x)_n- \quad (1)$$

(wherein n is an integer and x is 1 or 2).

The amount of the fluorinated graphite is preferably at least 0.1 part by weight, more preferably at least 0.5 part by weight, further preferably 1 part by weight, based on 100 parts by weight of the rubber component. When the amount is less than 0.1 part by weight, the effect of inhibiting reversion may not be sufficiently obtained. Also, the amount of the fluorinated graphite is preferably at most 50 parts by weight, more preferably at most 30 parts by weight, further preferably at most 20 parts by weight, most preferably at most 10 parts by weight. When the amount is more than 50 parts by weight, not only is cost high, but also abrasion resistance tends to decrease. From the viewpoint that the effect of inhibiting reversion and the effect of improving rubber properties when vulcanizing at high temperatures are increased, the amount of the fluorinated graphite is preferably 1 to 10 parts by weight.

To the rubber composition of the present invention, silica and/or an inorganic filler represented by formula (2) can be compounded $$mM \cdot xSiO_y \cdot zH_2O \quad (2)$$

(wherein M is at least one member selected from the group consisting of a metal selected from the group consisting of aluminum, magnesium, titanium, calcium and zirconium, oxides and hydroxides of the metals, hydrides thereof, and carbonates of the metals and m, x, y and z are fixed numbers).

The nitrogen-adsorbing specific surface area ($N_2SA$) of the silica is preferably at least 100 $m^2/g$, preferably at least 130 $m^2/g$. When $N_2SA$ of the silica is less than 100 $m^2/g$, the reinforcing effects to the rubber composition tend to be small. Also, the $N_2SA$ of the silica is preferably at most 300 $m^2/g$, more preferably at most 280 $m^2/g$. When $N_2SA$ of the silica is more than 300 $m^2/g$, dispersability of the silica decreases and heat generating properties of the rubber composition increase, thus being unfavorable.

The amount of silica is preferably at least 5 parts by weight, more preferably at least 10 parts by weight, further preferably at least 15 parts by weight, based on 100 parts by weight of the rubber component. When the amount of silica is less than 5 parts by weight, the effect of decreasing heat generation of the tire and wet grip performance may not be obtained. Also, the amount of silica is preferably at most 150 parts by weight, more preferably at most 120 parts by weight, further preferably at most 100 parts by weight. When the amount of silica is more than 150 parts by weight, processability and workability when preparing the rubber composition become poor, thus being unfavorable.

In the rubber composition of the present invention, a silane coupling agent can be used together with silica. Examples of the silane coupling agents that can suitably be used in the present invention are bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-methyldiethoxysilylpropyl)tetrasulfide, bis(2-methyldiethoxysilylethyl)tetrasulfide, bis(4-methyldiethoxysilylbutyl)tetrasulfide, bis(3-methyldimethoxysilylpropyl)tetrasulfide, bis(2-methyldimethoxysilylethyl)tetrasulfide, bis(4-methyldimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, bis(3-methyldiethoxysilylpropyl)disulfide, bis(2-methyldiethoxysilylpropyl)disulfide, bis(4-methyldiethoxysilylpropyl)disulfide, bis(3-methyldimethoxysilylpropyl)disulfide, bis(2-methyldimethoxysilylbutyl)disulfide, bis(4-methyldimethoxysilylbutyl)disulfide, 3-mercaptopropyltrimethoxysilane, 3-mercaptopropyltriethoxysilane, 2-mercaptoethyltrimethoxysilane, 2-mercaptoethyltriethoxysilane, 3-aminopropyltriethoxysilane, 3-aminopropyltrimethoxysilane, 3-(2-aminoethyl)aminopropyltriethoxysilane, 3-(2-aminoethyl)aminopropyltrimethoxysilane, γ-glycidoxypropyltriethoxysilane, γ-glycidoxypropyltrimethoxysilane, γ-glycidoxypropylmethyldiethoxysilane and γ-glycidoxypropylmethyldimethoxysilane. Of these, from the viewpoints that excellent effects are obtained and cost is low, bis(3-triethoxysilylpropyl)tetrasulfide and bis(3-triethoxysilylpropyl)disulfide are suitably used. These silane coupling agents can be used alone or two or more kinds can be used together.

The amount of the silane coupling agent is preferably 1 to 20% by weight based on the amount of silica. When the amount of the silane coupling agent is less than 1% by weight, the effects obtained by adding the silane coupling agent are insufficient. When the amount is more than 20% by weight, the coupling effect is not obtained although cost is high and reinforcing properties and abrasion resistance tend to decrease, thus being unfavorable. From the viewpoints of dispersability of the silane coupling agent and excellent coupling effect, the amount of the silane coupling agent is preferably 2 to 15% by weight.

To the rubber composition of the present invention, carbon black can be compounded.

The nitrogen-adsorbing specific surface area ($N_2SA$) of the carbon black is preferably at least 70 $m^2/g$, more preferably at least 80 $m^2/g$. Also, $N_2SA$ of the carbon black is preferably at most 180 $m^2/g$. The (DBP) dibutyl phthalate oil absorption of the carbon black is preferably at least 70 ml/100 g, more preferably at least 80 ml/100 g. Also, the DBP oil absorption of the carbon black is at most 160 ml/100 g. When $N_2SA$ of carbon black is less than 70 $m^2/g$ and DBP absorption is less than 70 ml/100 g, the reinforcing effects to the rubber composition are small, thus being unfavorable.

Specific examples of the carbon black are HAF, ISAF and SAF, but the carbon black is not particularly limited.

The amount of carbon black is preferably at least 5 parts by weight, more preferably at least 10 parts by weight, further preferably at least 15 part by weight, most preferably at least 20 parts by weight, based on 100 parts by weight of the rubber component. When the amount of carbon black is less than 5 parts by weight, sufficient reinforcing properties may not be obtained. Also, the amount of carbon black is preferably at most 200 parts by weight, more preferably at most 150 parts by weight, further preferably at most 120 parts by weight, most preferably at most 100 parts by weight. When the amount is more than 200 parts by weight, not only does workability decrease, but also heat generating properties tend to increase.

Besides the rubber component, fluorinated graphite, silica, inorganic filler, silane coupling agent and carbon black, the rubber composition of the present invention can contain compounding agents that are commonly used in the rubber industry, such as a softening agent, an antioxidant, a vulcanizing agent, a vulcanization accelerator and a vulcanization accelerating aid, when necessary.

As the softening agent, oil is preferably used. Examples of the oil are process oil, aroma oil and vegetable oil.

As the vulcanizing agent, sulfur is preferably used.

The amount of the vulcanization amount is preferably at least 0.1 part by weight, more preferably at least 0.5 part by weight, based on 100 parts by weight of the rubber component. When the amount is less than 0.1 part by weight, crosslinking density is low and properties tend to decrease significantly. Also, the amount of the vulcanizing agent is preferably at most 10 parts by weight, more preferably at most 4 parts by weight. When the amount is more than 10 parts by weight, rigidity becomes too high and heat resistance and aging resistance tend to decrease.

The amount of the vulcanization accelerator is preferably at least 0.1 part by weight, more preferably at least 1 part by weight, based on 100 parts by weight of the rubber component. When the amount of the vulcanization accelerator is less than 0.1 part by weight, the vulcanization rate tends to decrease significantly. Also, the amount of the vulcanization accelerator is preferably at most 10 parts by weight, more preferably at most 5 parts by weight. When the amount of the vulcanization accelerator is more than 10 parts by weight, rubber scorching tends to occur.

The pneumatic tire of the present invention can be prepared by the usual method using the rubber composition of the present invention. That is, the rubber composition of the present invention, in which the above additives are compounded when necessary, is extrusion processed into the shape of each member of a tire before vulcanization and then molded by the usual method on a tire molding machine to form an unvulcanized tire. The unvulcanized tire is heated and pressurized in a vulcanizer to obtain a pneumatic tire.

Hereinafter, the present invention is explained in detail based on Examples, but the present invention is not limited thereto.

The materials used in Examples are described below.
Natural rubber: RSS #3
Sytrene-butadiene copolymer rubber: SBR 1502 (amount of styrene units: 23.5% by weight) available from JSR Corporation
Epoxidized natural rubber: ENR-50 (epoxidization degree: 50% by mol) available from Kumplan Guthrie Berhad (Malaysia)
Carbon black 1: SHOWBLACK N220 ($N_2SA$: 111 $m^2/g$, DBP absorption: 115 ml/100 g) available from Showa Cabot Co. Ltd.
Carbon black 2: SHOWBLACK N110 ($N_2SA$: 143 $m^2/g$, DBP absorption: 113 ml/100 g) available from Showa Cabot Co. Ltd.
Oil: JOMO Process X-140 available from Japan Energy Corporation
Wax: SUNNOC Wax available from Ouchi Shinko Chemical Industrial Co., Ltd.
Silica: Ultrasil VN3 ($N_2SA$: 210 $m^2/g$) available from Degussa Co.
Silane coupling agent: Si69 (bis(3-triethoxysilylpropyl)tetrasulfide) available from Degussa Co.
Antioxidant: NOCRAC 6C (N-(1,3-dimethylbutyl)-N'-phenyl-p-phenylendiamine) available from Ouchi Shinko Chemical Industrial Co., Ltd.
Stearic acid: Stearic acid available from NOF Corporation
Zinc oxide: Zinc Oxide type 1 available from Mitsui Mining and Smelting Co., Ltd.
Fluorinated graphite: CEFBON-CMA available from Central Glass Co., Ltd.
Sulfur: Powdery sulfur available from Tsurumi Chemicals Co., Ltd.
Vulcanization Accelerator 1: Nocceler CZ (N-cyclohexyl-2-benzothiazolylsulfenamide) available from Ouchi Shinko Chemical Industrial Co., Ltd.
Vulcanization Accelerator 2: Nocceler NS (N-t-butyl-2-benzothiazolylsulfenamide) available from Ouchi Shinko Chemical Industrial Co., Ltd.

(Processing Method)

According to the composition shown in Tables 1, 2 and 3, each of the materials were kneaded and mixed to obtain unvulcanized rubber compositions. The rubber compositions were press vulcanized at 170° C. for 20 minutes to obtain vulcanized articles. The following tests of properties were conducted regarding these articles.

EXAMPLES 1 to 3 and COMPARATIVE EXAMPLE 1

The testing methods of the tests of properties conducted in Examples 1 to 3 and Comparative Example 1 are described below.

(Scorching Time)

The time (minutes) required for the viscosity to increase 5 points at 130° C. was measured according to JIS K6300.

(Vulcanization Time)

The vulcanization properties were measured according to JIS K6300 and the time required for the vulcanization degree to reach 95% at 170° C. was measured. Also, the reversion ratio 30 minutes after maximum torque was found from the following equation.

{Reversion ratio from maximum torque (%)}={(maximum torque)−(torque after 30 minutes)}/(maximum torque)×100

The measurement results are shown in Table 1.

TABLE 1

|  | Ex. 1 | Ex. 2 | Ex. 3 | Com. Ex. 1 |
|---|---|---|---|---|
| Composition (parts by weight) | | | | |
| Natural rubber | 100 | 100 | 100 | 100 |
| Carbon black 1 | 40 | 40 | 40 | 40 |
| Oil | 20 | 20 | 20 | 20 |
| Wax | 1 | 1 | 1 | 1 |
| Antioxidant | 1 | 1 | 1 | 1 |
| Stearic acid | 2 | 2 | 2 | 2 |
| Zinc oxide | 3 | 3 | 3 | 3 |
| Fluorinated graphite | 1 | 5 | 10 | — |
| Sulfur | 1 | 1 | 1 | 1 |
| Vulcanization accelerator 1 | 2 | 2 | 2 | 2 |
| Total | 171 | 175 | 180 | 170 |
| Evaluation | | | | |
| Scorching time (minutes) | 24.6 | 28.1 | 32.4 | 22.4 |
| Time for 95% vulcanization (minutes) | 4.8 | 7.3 | 10.2 | 2.4 |
| Reversion ratio from maximum torque (%) | at most 5 | at most 1 | at most 1 | 24 |

EXAMPLES 4 to 9 and COMPARATIVE EXAMPLES 2 to 7

The testing methods of the tests of properties conducted in Examples 4 to 9 and Comparative Examples 2 to 7 are described below. The tests for "the time required for the vulcanization degree to reach 95%" and "the reversion ratio from maximum torque" were conducted in the same manner as in Examples 1 to 3 and Comparative Example 1.

(Elastic Modulus (M300))

The tensile stress when stretched 300% (M300) was measured according to JIS K6301.

(Abrasion Test)

The amount of Lambourn abrasion was measured under conditions of temperature of 20° C., slip ratio of 20% and testing time of 5 minutes using a Lambourn abrasion tester. In Table 2, the abrasion loss of Comparative Example 2 was assumed to be 100 and abrasion resistance was represented as an index by the following equation.

Abrasion index=(tan δ of Com. Ex. 2)/(tan δ of each composition)×100

In Table 3, the abrasion loss of Comparative Example 5 was assumed to be 100 and abrasion resistance was represented as an index by the following equation. The larger the abrasion index is the better the abrasion resistance.

Abrasion index=(tan δ of Com. Ex. 5)/(tan δ of each composition)×100

The measurement results are shown in tables 2 and 3.

TABLE 2

|  | Ex. 4 | Ex. 5 | Ex. 6 | Com. Ex. 2 | Com. Ex. 3 | Com. Ex. 4 |
| --- | --- | --- | --- | --- | --- | --- |
| Composition (parts by weight) |  |  |  |  |  |  |
| Natural rubber | — | 50 | — | — | 50 | — |
| Epoxidized natural rubber | 100 | 50 | 30 | 100 | 50 | 30 |
| SBR | — | — | 70 | — | — | 70 |
| Carbon black 2 | 50 | 50 | 50 | 50 | 50 | 50 |
| Silica |  |  |  |  |  |  |
| Silane coupling agent |  |  |  |  |  |  |
| Antioxidant | 1 | 1 | 1 | 1 | 1 | 1 |
| Stearic acid | 1 | 1 | 1 | 1 | 1 | 1 |
| Zinc oxide | 3 | 3 | 3 | 3 | 3 | 3 |
| Fluorinated graphite | 5 | 5 | 5 | — | — | — |
| Sulfur | 1 | 1 | 1 | 1 | 1 | 1 |
| Vulcanization accelerator 2 | 2 | 2 | 2 | 2 | 2 | 2 |
| Evaluation results |  |  |  |  |  |  |
| Time for 95% vulcanization (minutes) | 7.7 | 7.9 | 11.4 | 2.6 | 2.7 | 11.2 |
| Reversion ratio from maximum torque (%) | 0.9 | 1.1 | 0.4 | 25.2 | 26.1 | 0.7 |
| Elastic modulus (MPa) | 17.8 | 18.5 | 17.6 | 14.1 | 14.9 | 16.3 |
| Abrasion index | 104 | 100 | 102 | 100 | 95 | 97 |

TABLE 3

|  | Ex. 7 | Ex. 8 | Ex. 9 | Com. Ex. 5 | Com. Ex. 6 | Com. Ex. 7 |
| --- | --- | --- | --- | --- | --- | --- |
| Composition (parts by weight) |  |  |  |  |  |  |
| Natural rubber | — | 50 | — | — | 50 | — |
| Epoxidized natural rubber | 100 | 50 | 30 | 100 | 50 | 30 |
| SBR | — | — | 70 | — | — | 70 |
| Carbon black 2 | — | — | — | — | — | — |
| Silica | 50 | 50 | 50 | 50 | 50 | 50 |
| Silane coupling agent | 5 | 5 | 5 | 5 | 5 | 5 |
| Antioxidant | 1 | 1 | 1 | 1 | 1 | 1 |
| Stearic acid | 1 | 1 | 1 | 1 | 1 | 1 |
| Zinc oxide | 3 | 3 | 3 | 3 | 3 | 3 |
| Fluorinated graphite | 5 | 5 | 5 | — | — | — |
| Sulfur | 1 | 1 | 1 | 1 | 1 | 1 |
| Vulcanization accelerator 2 | 2 | 2 | 2 | 2 | 2 | 2 |
| Evaluation results |  |  |  |  |  |  |
| Time for 95% vulcanization (minutes) | 8.1 | 8.0 | 14.8 | 3.8 | 3.9 | 15.4 |
| Reversion ratio from maximum torque (%) | 0.7 | 0.9 | 0.3 | 26.8 | 27.3 | 0.4 |
| Elastic modulus (MPa) | 11.7 | 12.2 | 15.4 | 10.3 | 11.1 | 14.8 |
| Abrasion index | 105 | 100 | 102 | 100 | 91 | 96 |

According to the present invention, a rubber composition in which reversion which vulcanizing at high temperatures is inhibited without losing rubber properties, by compounding fluorinated graphite in a rubber component containing diene rubber, and a pneumatic tire using the rubber composition are provided.

What is claimed is:

1. A pneumatic tire which is formed from a rubber composition comprising a rubber component containing diene rubber and fluorinated graphite that satisfies the following formula (1)

—(CFx)n—     (1)

wherein n is an integer and x is 1 or 2.

2. The pneumatic tire rubber composition of claim 1, wherein the rubber composition comprises 0.1 to 50 parts by weight of fluorinated graphite, based on 100 parts by weight of a rubber component containing diene rubber.

3. The pneumatic tire of claim 1, wherein the rubber composition comprises 5 to 100% by weight of epoxidized natural rubber is contained in said rubber component as diene rubber.

4. The pneumatic tire of claim 1, wherein the rubber composition comprises 5 to 150 parts by weight of silica having nitrogen adsorbing specific surface area of 100 to 300 m$^2$/g is contained based on 100 parts by weight of said rubber component.

5. The pneumatic tire of claim 1, wherein the rubber composition comprises 5 to 150 parts by weight of carbon black having nitrogen adsorbing specific surface area of 70 to 300 m$^2$/g is contained based on 100 parts by weight of said rubber component.

* * * * *